March 31, 1959 K. M. MacDOWELL 2,880,395
MICROWAVE MODULATION MONITORING
Filed April 8, 1954
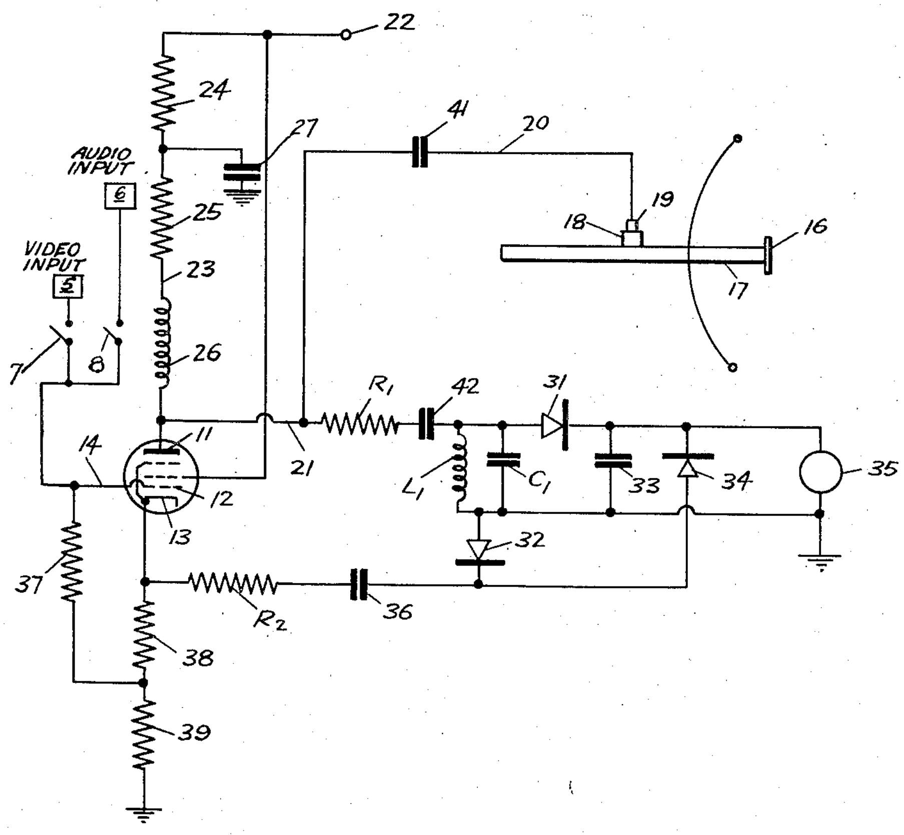
INVENTOR
KENNETH M. MACDOWELL
BY Elmer J. Gorn
ATTORNEY 2,880,395
Patented Mar. 31, 1959

2,880,395

MICROWAVE MODULATION MONITORING

Kenneth M. MacDowell, West Newton, Mass., assignor to Raytheon Manufacturing Company, Waltham, Mass., a corporation of Delaware Application April 8, 1954, Serial No. 421,719
3 Claims. (Cl. 332—20)

This invention relates to microwave modulation monitoring, that is, to the control of the peak modulation values in a microwave system, and particularly in a system requiring transmission of a composite video signal with audio subcarrier.

In microwave transmission systems employing a superhigh frequency local oscillator (klystron or its equivalent) to generate a carrier wave with an audio signal subcarrier, it is desirable to hold carrier frequency deviations due to the audio subcarrier within rather strict limits, for otherwise an optimum signal-to-noise ratio, and other threshold desiderata, cannot be maintained. The present invention provides methods and means for maintaining carrier frequency deviations due to such audio subcarrier within predetermined limits.

The method herein disclosed operates to hold carrier frequency deviations due to audio subcarrier to an amount that will be related to the magnitude of the carrier frequency deviations due to the video signal, so that the carrier frequency deviations due to audio subcarrier will never exceed a predetermined percentage of the video deviations. The illustrated arrangement, representing an efficient embodiment of the invention, has been found to be effective in maintaining a ratio of 4 to 1 as between video and audio subcarrier frequency deviations. The disclosed method includes the step of monitoring the peak audio subcarrier and video modulation levels on the same meter when each is applied separately to the modulator, and also monitor the sum of audio subcarrier and video when both are applied simultaneously. This is done in such manner as not to interfere with either video or subcarrier signal voltages being supplied to the repeller circuit of the klystron oscillator.

Other and further characteristics and advantages of this invention will be apparent as the description thereof progresses, reference being had to the accompanying drawing.

In the drawing, reference numerals 11, 12, and 13 designate the plate, control grid and cathode, respectively, of a pentode amplifier excited by voltage supplied over line 14 adapted to carry a composite video signal with video input from a source 5, and with audio subcarrier input from a source 6, the amplifier output being supplied to line 20 which attaches to repeller terminal 19 of klystron 18 controlling transmission through wave guide 17 to antenna 16. Line 20 is tapped into the plate circuit of the amplifier by way of lead 21, the plate circuit being powered from source 22 by way of lead 23 containing resistors 24 and 25, inductance 26, and grounded condenser 27.

The voltage at the plate 11 is coupled through an isolation and voltage dividing resistor R1 and a condenser 42 to a tuned circuit L1, C1 tuned to an appropriate subcarrier frequency and therefore operating to reject video frequencies. The voltage developed across this tuned circuit is rectified by diode 31.

To test the sources 5 and 6 for their respective modulation values, the operator will close switches 7 and 8 in sequence. Thus the voltage at plate 11, which is proportional to the subcarrier modulation voltage, may be separately measured (assuming switch 8 to be closed and switch 7 opened) on the meter 35. Similarly, the voltage at the cathode which is coupled through an isolation and voltage dividing resistor R2 and condenser 36 to voltage doubler rectifiers 32 and 34, and is proportional to peak video modulating voltage, may be separately measured on meter 35 by closing switch 7 and opening switch 8.

Of course, during actual use of the system, that is, except during the taking of the separate measurements just referred to, both switches 7 and 8 remain closed, thus permitting continuous display, on meter 35, of a reading representative of the composite video-audio content of the transmitted energy. In order to keep resistors R1 and R2 as large as possible compared to their driving source impedances, the subcarrier component is derived from the plate circuit and the video component from the cathode circuit. Since the driving impedance of the plate is appreciable compared to R1, a large coupling condenser is necessary to keep a five percent change in frequency response of the video amplifier at low enough frequency to prevent distortion of video sync pulses. This is not necessary on the cathode because R2 is very large compared to the cathode driving impedance.

The diodes operate at very low voltages in the square law region but over a fairly small dynamic range so that the D.C. voltages are substantially in linear relation to the A.C. driving voltages. The D.C. developed by the video depends somewhat on picture content, i.e., average level, but if deviation is established with a fixed picture and the sync pulse amplitude is maintained constant, peak-to-peak deviation is also maintained constant even though meter readings may vary.

Since this metering device only measures repeller drive, the actual deviation may vary from klystron to klystron due to different deviation sensitivities traceable to manufacturing variances. However, the ratio of subcarrier to video is, of course, not affected thereby.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. Monitoring apparatus for use in a system utilizing a composite signal having amplitude and frequency modulated components comprising an amplifying tube having a control grid, plate and cathode load impedances connected to said tube, means for impressing said components as a composite signal or as individual signals on said control grid, a circuit tuned to the carrier frequency of said frequency modulated component, said circuit being connected to the plate of said tube, a rectifier connected to said tuned circuit, a storage capacitor in series with said rectifier, means connected to said storage capacitor for rectifying the voltage developed across said cathode load impedance, and means for indicating the voltage across said storage capacitor.

2. Apparatus for use in a microwave transmitting system utilizing a composite signal having an amplitude modulated component and a frequency modulated component comprising an amplifying tube having a control grid, plate and cathode load impedances connected to said tube, means for impressing said components as a composite signal or as individual signals on said control grid, a microwave generator having an input connection for effecting modulation of the output of said generator, means for impressing signals derived from the plate of said amplifier on said input connection, a parallel resonant circuit connected to the plate of said tube, said circuit being tuned to the carrier frequency of said frequency modulated component, a rectifier connected to said tuned circuit for rectifying the voltage thereacross, a storage capacitor in series with said rectifier, means connected to said storage capacitor for rectifying the voltage developed across said cathode load impedance, and an indicator connected to said storage capacitor for indicating the voltage across said capacitor.

3. Apparatus for use in a microwave transmitting system utilizing a composite signal having a frequency modulated audio component and an amplitude modulated video component comprising an amplifying tube having a cathode, control grid, and plate, load impedances connected to the cathode and plate of said tube, means for impressing said components as a composite signal or as individual signals on said control grid, a microwave generator having an input connection for effecting modulation of the output of said generator, means for impressing signals derived from said plate on said input connection, a parallel resonant circuit connected to said plate, said circuit being tuned to the carrier frequency of said frequency modulated audio component, rectifying means connected across said tuned circuit, said rectifying means including a storage capacitor, means including said storage capacitor for rectifying the voltage developed across said cathode load impedance, and an indicator connected to said storage capacitor to indicate the voltage across said storage capacitor.

References Cited in the file of this patent

UNITED STATES PATENTS

| | | |
|---|---|---|
| 2,076,685 | Tringham | Apr. 13, 1937 |
| 2,282,102 | Tunick | May 5, 1942 |
| 2,678,427 | Smith | May 11, 1954 |